(12) United States Patent
Kaufman et al.

(10) Patent No.: US 7,800,018 B2
(45) Date of Patent: Sep. 21, 2010

(54) METHOD AND SYSTEM OF WELDING WITH ADAPTIVE CRATER FILL CONTROL

(75) Inventors: Charles L. Kaufman, Neenah, WI (US); Gary L. Scheelk, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 1039 days.

(21) Appl. No.: 11/012,700

(22) Filed: Dec. 15, 2004

(65) Prior Publication Data

US 2006/0124623 A1   Jun. 15, 2006

(51) Int. Cl.
*B23K 9/10* (2006.01)
(52) U.S. Cl. .................. 219/137.71; 219/137 R
(58) Field of Classification Search .............. 219/130.5, 219/132, 137.71
See application file for complete search history.

(56) References Cited

U.S. PATENT DOCUMENTS

| | | | | |
|---|---|---|---|---|
| 2,776,361 A | * | 1/1957 | Essig | 219/74 |
| 3,686,465 A | * | 8/1972 | Urbanic | 219/137.71 |
| 4,283,618 A | * | 8/1981 | Jakob | 219/130.5 |
| 4,868,366 A | * | 9/1989 | Joseph et al. | 219/137.71 |
| 6,114,657 A | * | 9/2000 | Hayes et al. | 219/137.71 |
| 7,256,368 B2 | * | 8/2007 | Artelsmair et al. | 219/130.51 |

FOREIGN PATENT DOCUMENTS

WO    WO 03084705 A1 * 10/2003

* cited by examiner

*Primary Examiner*—Stephen J Ralis
(74) *Attorney, Agent, or Firm*—Fletcher Yoder

(57) ABSTRACT

The present invention is directed to a system and method of automatically adjusting the operating parameters of a welding-type system based on the type of welding being carried out. The invention includes a controller that is configured to automatically delineate between a tacking and a welding mode of operation. The controller is also designed to decrement a timer at the onset of a welding event and if the timer expires before the welding event is complete, then automatically enable a crater fill control feature of the welding-type system being used to support the weld event. If the timer has not expired when the weld event is terminated, then the controller automatically disables the crater fill control features and prevents the delivery of post-weld event termination filler to the weld or maintenance of a welding power at the weld sufficient to melt a consumable electrode.

20 Claims, 3 Drawing Sheets

METHOD AND SYSTEM OF WELDING WITH ADAPTIVE CRATER FILL CONTROL

BACKGROUND OF THE INVENTION

The present invention relates generally to crater fill controls for a welding-type process and, more particularly, to a method and system of adaptively activating an automatic crater fill feature of a welding-type system based on the type of welding-type operation being carried out. The present invention is particularly applicable with automatically delineating between a tacking mode of operation and a welding mode of operation.

Tacking is a welding technique that is commonly used in light industrial applications for preliminarily fusing workpieces to one another such that the workpieces can be handled in a more manageable fashion when a final, complete weld is used to complete the fusing process. A "tack" is generally recognized as a light non-permanent weld between workpieces that can, if needed, be broken without damage to the workpieces. Tacking is often used in applications where a relatively precise alignment or orientation between workpieces to be joined is needed. Tacking allows the workpieces to be lightly weld together in a manner that allows the "tack" to be broken if the desired alignment is not achieved and retacked. Conventional welding techniques, such as Gas Metal Arc Welding (GMAW), which is also referred to as Metal Inert Gas (MIG) welding, and Gas Tungsten Arc Welding (GTAW), which is also referred to as Tungsten Inert Gas (TIG) welding, are then used to fuse the workpieces together with a conventional weld. Tacking of workpieces is generally achieved by running a very high energy, low voltage current between the workpieces. Dedicated tacking machines may be used for tacking or conventional welding machines may also be used.

A drawback of carrying out tacking with a conventional welding machine is crater fill controls. Many welding systems have crater fill features that can be activated such that the power source gradually ramps down at the completion of a weld event. Through this gradual ramping down, additional metal filler is delivered to the weld and is used to fill the divot or crater that typically occurs in a weld upon termination of the weld event. Generally, it is preferred to utilize a crater fill process such that the weld is cosmetically consistent, but crater filling can also be advantageously used to maintain structural consistency and integrity of the weld. Absent the filler material, the end of the weld may prematurely fracture thereby causing damage to the weld and affect the integrity of the fusion.

During tacking, however, there is less concern regarding the strength or cosmetic appearance of a tack. Additionally, tacking is generally carried out in a relatively quick manner; however, crater filling adds time to the welding process. Moreover, tacking is a technique used to form a non-permanent bond between workpieces such that the bond can be broken and the workpieces separated from one another damage free, if desired. Crater filling, however, adds to the amount of bonding metal between the workpieces which may hinder the separating of workpieces.

Some welding systems have been developed that allow a user to selectively enable or disable the automatic crater fill capabilities thereof. Some systems are set to a crater fill control OFF default. As such, for a user to take advantage of the crater fill capabilities of the welding system, the user must remember to enable the appropriate features when establishing the operating parameters of a welding session. Other systems are set to a crater fill control ON default. With these systems, the user must remember to disable the crater fill control features when tacking to avoid the time-consuming delivery of additional filler material to the weld.

Requiring a user to manually activate or deactivate a crater fill control feature of a welding system can be particularly problematic. For instance, if a user deactivates the crater fill control feature, tacks workpieces together, the user must then return to the control panel of the welding system, manually activate the crater fill control feature, and then return to the tacked workpieces and conventionally weld the workpieces together. For the user to then carry out another tacking process, the user must re-deactivate the crater fill control feature and iteratively repeat the tacking and welding processes. This can be particularly time consuming if the tacking and welding is carried out relatively remotely from the welding system which is not uncommon in industrial applications.

One solution is to have a dedicated tacking machine and a dedicated welding machine. As such, the user can use the tacking machine to tack the workpieces and then use the welding machine to complete the welding process. Such a solution, however, can be particularly costly as it requires additional equipment and, moreover, an inefficient use of resources for those welding machines capable of operating at the high energy, low voltage current levels required for effective tacking.

It would, therefore, be desirable to have a system and method capable of automatically determining if a tacking or a welding operation is being carried out and automatically setting operating parameters of a welding-type system accordingly.

BRIEF DESCRIPTION OF THE INVENTION

The present invention provides a system and method of automatically adjusting the operating parameters of a welding-type system based on the type of fusing being carried out that overcomes the aforementioned drawbacks.

A controller for controlling operation of a welding-type system is presented and configured to automatically delineate between a tacking and a welding mode of operation. The controller is designed to decrement a timer at the onset of a weld event and if the timer expires before the weld event is complete, i.e. welding gun trigger remains depressed, then automatically enable a crater fill control feature of the welding-type system being used to support the welding event. On the other hand, if the timer has not expired when the weld event is terminated, then the controller automatically disables the crater fill control features and prevents the delivery of post-weld event filler to the weld or maintenance of a welding power at the weld sufficient to melt a consumable electrode.

Therefore, in accordance with one aspect, the present invention includes a welding-type device comprising a controller configured to automatically deliver consumable material to a weld upon termination of a weld event. The controller is also configured to characterize the weld event as a welding event or a tacking event and, if a tacking event, prevent delivery of consumable material to the weld upon termination of the weld event.

In accordance with another aspect, the present invention includes a method of fusing objects. The method includes the steps of timing an active weld event and determining a temporal length of the active weld event from the timing. If the temporal length is less than a threshold, the method automatically adjusts operation of a welding system to be consistent with a tacking mode of operation. If the temporal length is greater than the threshold, the method automatically adjusts operation of the welding system to be consistent with a welding mode of operation.

According to another aspect of the present invention, a controller for a welding-type system is configured to receive feedback on a temporal length of a weld event and compare the temporal length to a threshold. The controller is then configured to selectively activate/deactivate a crater fill process based on the comparison.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
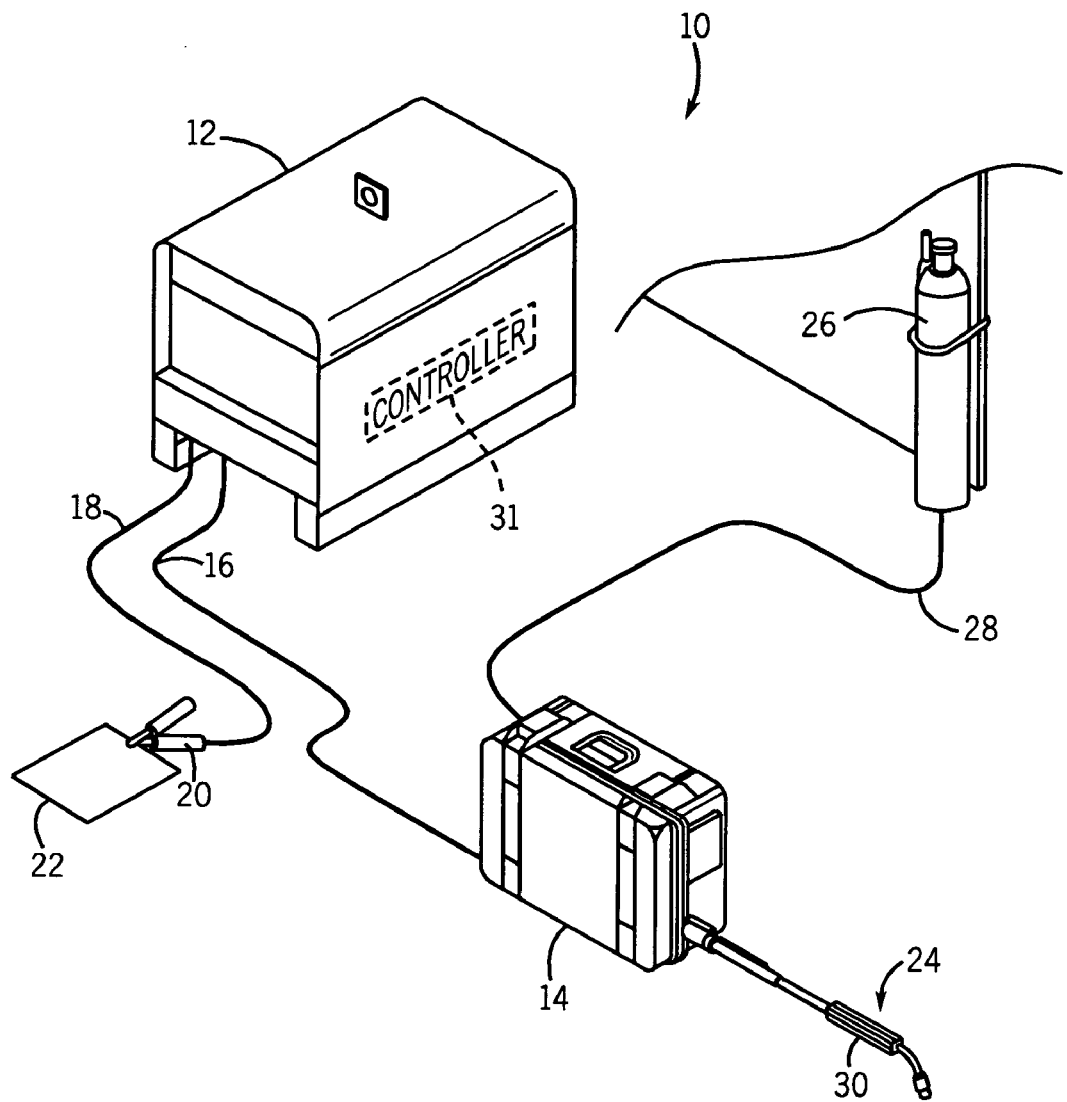
FIG. 1 is a perspective view of MIG welding system applicable with the present invention.

Referring to FIG. 1, a MIG welding system 10 includes a welding power source 12 designed to supply power to a wire feeder 14 through a weld cable 16. The power source is designed to run in one of a number of modes including constant voltage (CV) and constant current (CC). Also connected to the power source is a secondary work weld cable 18 that connects the power source to a clamp 20 designed to connect cable 18 to workpiece 22. Also connected to wire feeder 14 is a welding gun or torch 24 configured to supply consumable welding wire to a weld. Welding system 10 may further include a gas cylinder 26 connected to wire feeder 14 such that shielding gas can be provided through gas hose 28 for the MIG welding process. It is contemplated that the gas cylinder may be mounted to or in either power source 12 or wire feeder 14.

Power source 12 is designed to condition raw power supplied from a utility line or engine driven power supply and output power usable by the welding process. As such, power source 12 includes one or more transformer assemblies or power conditioners (not shown) to condition the raw power into a usable form for welding. The output of the power source is generally controlled by a controller 31 and associated operational circuitry that regulates the secondary or output side of the power conditioning components. This secondary output is then translated across the weld cable 16 to create a voltage potential between workpiece 22 and an electrode. Torch 24 is equipped with a pushbutton trigger 30 that when depressed causes a contactor (not shown) of the wire feeder to close and make a welding voltage available to the torch.

One skilled in the art will appreciate that MIG welding combines the techniques and advantages of TIG welding's inert gas shielding with a continuous, consumable wire electrode that is delivered to a weld by wire feeder 14. An electrical arc is created between the continuous, consumable wire electrode and the workpiece 22. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding an efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld cleanup is typically minimized. Another advantage of MIG welding is that it can be done in most positions which can be an asset for manufacturing and repair work where vertical or overhead welding may be required.

MIG welders, as well as TIG welders, are commonly equipped with a crater fill feature that when selected by an operator causes additional filler material to be delivered to the weld after the operator has released the welding torch trigger or otherwise signaled termination of the weld event. This additional filler is used to fill the crater or divot that may otherwise occur at the completion of the weld. To achieve this additional deposition of filler, the power source will ramp down the voltage and current available at its output when the trigger is released. As the power ramps down, additional wire or electrode is consumed and fused to the workpiece. This feature is commonly referred to as a crater fill control and is frequently used to provide a consistent weld appearance as well as achieve consistent weld integrity.

Figure 2:
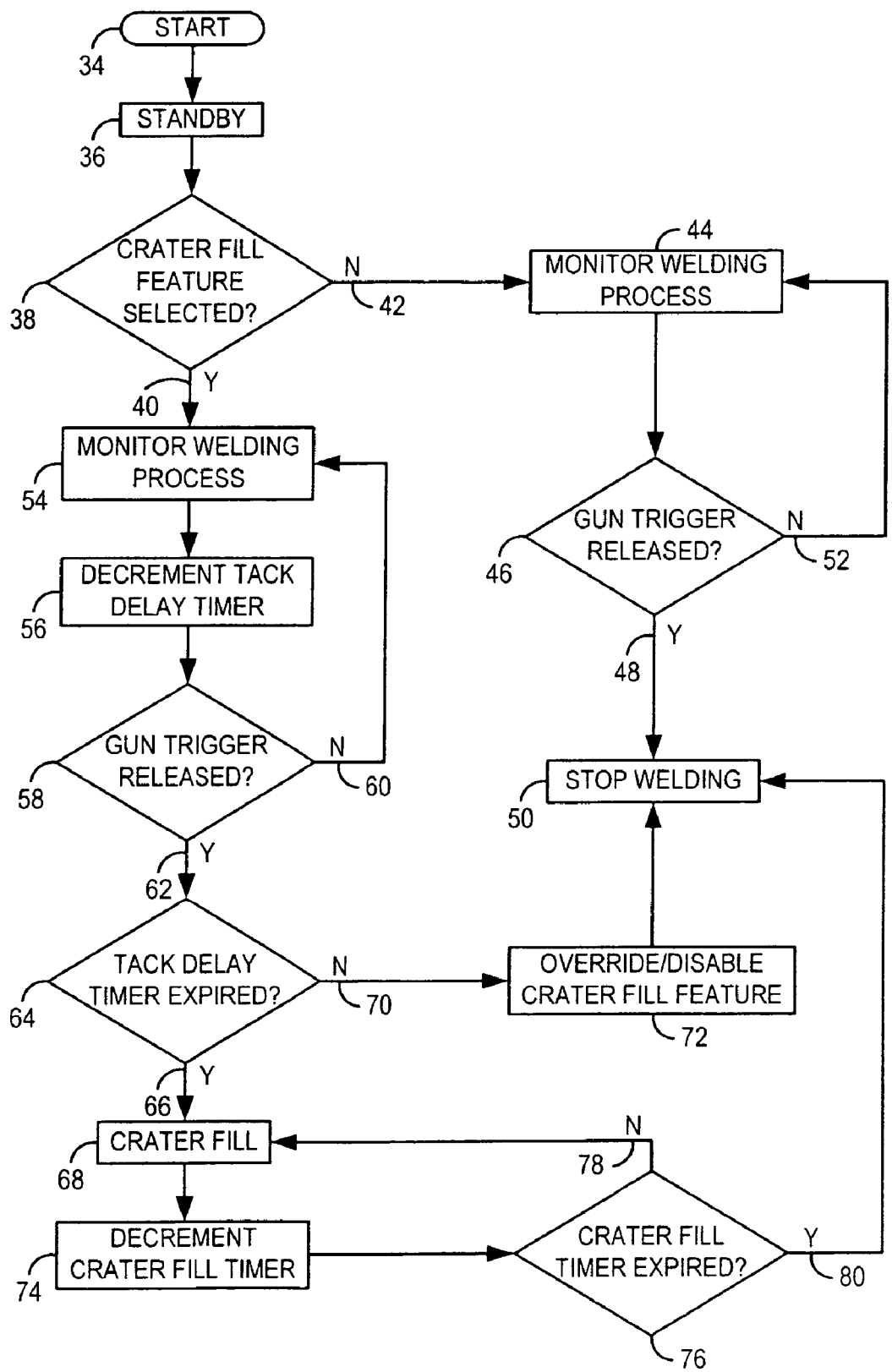
FIG. 2 is a flow chart setting forth the steps of an automatic crater fill control overriding technique according to one aspect of the present invention.

As referenced above, however, crater filling is generally not advantageous when tacking workpieces. Accordingly, the present invention is directed to a technique and associated controls for implementing the technique to automatically determine if the welding system is in a tacking or a welding mode of operation. Based on the mode of operation, the crater fill feature will be selectively and automatically activated or deactivated. One skilled in the art will appreciate that the power source includes hardware, firmware, software, processors, and controllers to carry out the adaptive crater fill control techniques described below. Additionally, it recognized that said hardware, firmware, software, processors, and controllers may be housed in the wire feeder or the welding torch. The steps of this technique are illustrated in FIG. 2.

The adaptive crater fill control technique 32 begins at 34 with powering-up of the welding system and operator selection and inputting of operating parameters. These parameters may include wire feed speed, voltage and current levels, constant current or constant voltage modes of operation or variants thereof, and selection of a crater fill feature. As will be described in greater detail below, the welding system controller may override a user selection of the crater fill feature if the welding system is being used for tacking rather than welding. In this regard, the present invention accommodates welding environments and welding systems where crater fill is a default selection. Additionally, by allowing selective overriding of this crater fill feature, the present invention relieves an operator of having to repeatedly de-select and select the crater fill feature when iteratively tacking and welding. In another embodiment, the welding system may be equipped such that initial user selection of a crater fill feature is not required. That is, the welding system, as will be described with respect to FIG. 3, will automatically prevent crater filling during tacking and automatically allow crater filling during welding.

Once the welding system is powered up 34, the system in placed in a stand-by mode of operation 36. The operator may continue to define operating parameters while the system is in stand-by. Operating parameters are typically entered on a control panel of the welding system power source, such as that illustrated in FIG. 1. It is contemplated, however, that the operating parameters may be input on a peripheral device of the welding system, such as a control panel on the wire feeder or on a control panel on the welding gun or torch.

Once the operating parameters have been input or otherwise established 36, the welding system controller determines if the operator has selected the crater fill feature of the welding system 38. If the operator has elected the crater fill feature 38, 40 to be enabled, crater filling will occur at the completion of the weld event unless overridden in a manner as described below. If the crater fill feature is not selected 38, 42, additional filler material will not be delivered to the weld after the weld event is terminated. In this regard, the welding process will be monitored 44 in a conventional manner until the gun trigger is released or other signal is received indicating that the weld event is complete. Accordingly, system controller determines, in one embodiment, if the trigger of the welding gun has been released 46 and, if so 46, 48, welding ceases abruptly without crater filling 50. If the gun trigger is not released 46, 52, technique loops back to step 44 with continued monitoring of the welding process.

On the other hand, if the crater fill feature is selected at 38, the welding process is likewise monitored 54 as is a tack delay timer 56. More particularly, the tack delay timer is set to a default value, e.g. 1.0 second, before the welding process is initiated and once welding is initiated 54, the tack delay timer is decremented 56. While the tack delay timer is decremented, the system controller determines if the weld event is active or ongoing, e.g. determines, in one embodiment, if the gun trigger has been released 58. If not 58, 60, the controller returns to monitoring the welding process at 54 and the tack delay timer is decremented 56. If the gun trigger is released or other signal received indicating that the weld event is complete 58, 62, the controller determines if the tack delay timer has expired 64. If the tack delay timer has expired when the gun trigger is released 64, 66, the system controller allows the user-selected crater filling to be carried out 68. On the other hand, if the tack delay timer did not expire before the gun trigger was released 64, 70 then the user-selected crater fill control is overridden and otherwise disabled at 72. In this regard, additional filler will not be delivered to the weld after the gun trigger is released, and the welding process ends at 50 whereupon the system is turned OFF or returns to standby.

The welding system controller characterizes the type of fusing that is being implemented based on the status of the tack delay timer when the gun trigger is released. If the gun trigger is released before the tack delay timer expires, the type of fusing is characterized as tacking and, as such, crater filling, which is generally undesirable when tacking, does not occur. On the other hand, if the tack delay timer has expired when the weld event is terminated, thereby signaling a temporally longer weld event, crater filling occurs in a manner consistent with the parameters input by the operator during set-up. Accordingly, the adaptive crater fill control technique prohibits crater filling if the operator is tacking workpieces and allows crater filling if the operator is welding workpieces.

Still referring to FIG. 2, if the tack delay timer has expired at the close of the weld event 64, 66, crater filling occurs 68. Crater filling is typically a timed event and, as such, a crater fill timer is decremented at 74 when crater filling begins. Crater filling will continue until the crater fill timer expires 76, 78. Conversely, when the crater fill timer has expired 76, 80, crater filling is deemed complete, and welding ceases 50.

The technique described with respect to FIG. 2 is directed to an adaptive crater fill control technique that overrides a user-selection or user-enablement of a welding system's crater fill feature if the operator is tacking workpieces rather than welding workpieces. As will be described with respect to FIG. 3, the present invention is also directed to a technique that automatically and selectively enables the crater fill controls of a welding system based on the mode of fusing used to join workpieces.

Figure 3:
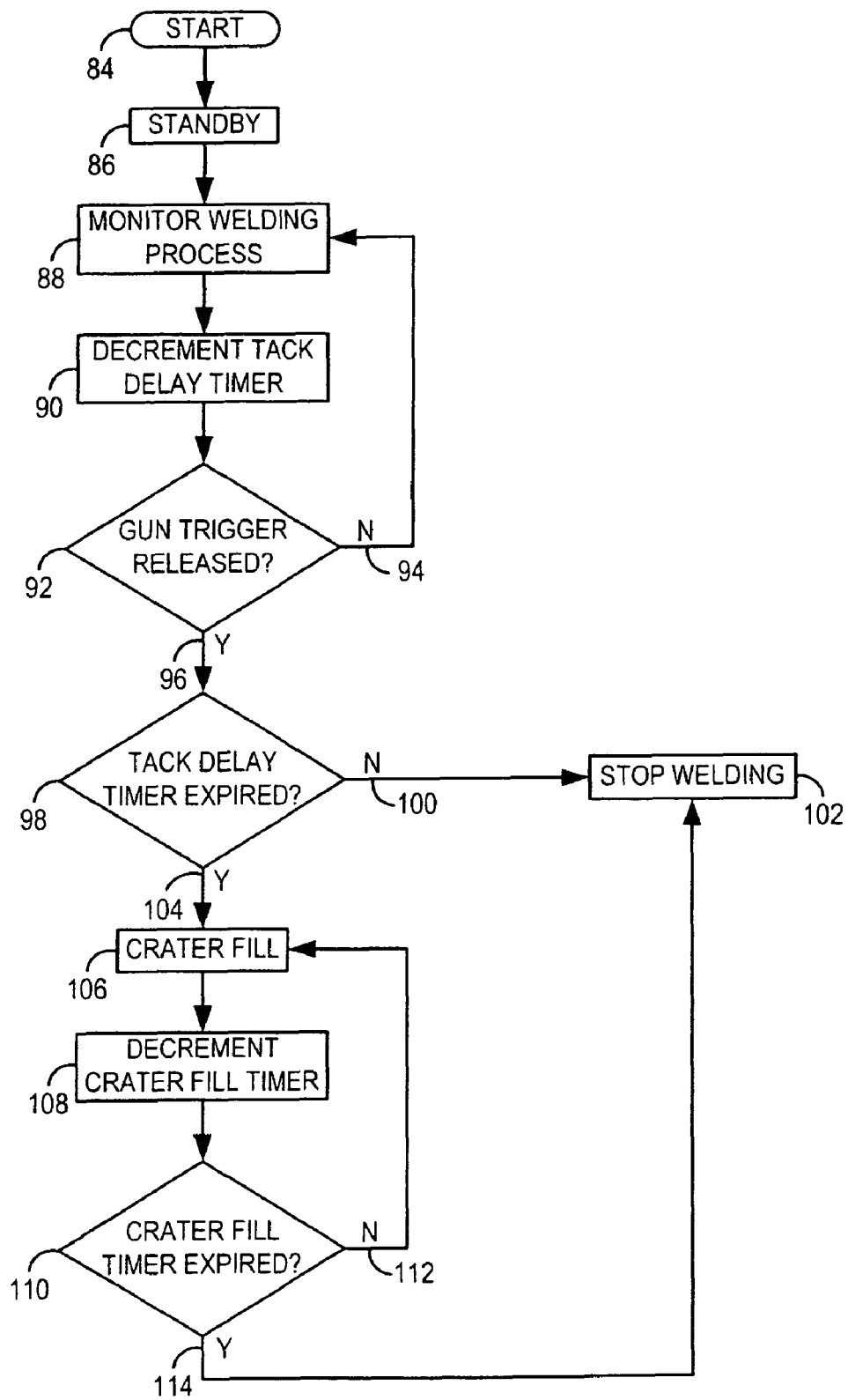
FIG. 3 is a flow chart setting forth the steps of an automatic crater fill control enablement technique according to another aspect of the present invention.

Referring now to FIG. 3, the steps of an alternate adaptive crater fill control technique 82 are provided. Technique 82 begins at 84 with powering-up of the welding system and operator selection and inputting of operating parameters. These parameters may include wire feed speed, voltage and current levels, constant current or constant voltage modes of operation or variants thereof, among others. After reaching a powered-up state, the welding system enters a stand-by mode 86. The operator may continue to input and establish the operating parameters of the welding system while the welding system is in stand-by. After the welding parameters have been entered and the worksite prepared for welding, the operator commences the welding process. Typically, the welding process begins when the operator depresses the trigger of the welding gun and the welding gun is placed in proximity to the workpiece.

Once welding has commenced, technique 82 monitors the welding process 88 to determine when the active weld event is terminated. Also, when welding commences, a tack delay timer is decremented 90 from a start value. The start value defines a threshold that is used to distinguish between a tacking mode of operation and a welding mode of operation. An exemplary start value is 1.0 second. The tack delay timer decrements from the start value while a weld event is active. When the weld event is terminated, e.g. gun trigger released 92, the reading of the tack delay timer is used to characterize the weld event as a tacking event or a welding event.

In this regard, technique determines at 92 if the gun trigger has been released. If not 92, 94, the technique loops back to step 88 with continued monitoring of the welding process and decrementing of the tack delay timer. On the other hand, if the trigger has been released 92, 96, the welding system controller determines if the tack delay timer has expired 98. If the timer has not expired 98, 100, the weld event is characterized as a tacking event and crater filling is inhibited and welding ceases in a conventional manner 102. Conversely, if the tack delay timer has expired 98, 104 at the termination of the weld event, the weld event is characterized as a welding event and crater filling is automatically enabled such that additional filler material is delivered to the weld at 106 notwithstanding the gun trigger having been released. In a manner similar to that described with respect to FIG. 2, the crater fill process is time-constrained and, as such, when crater filling commences 106, a crater fill timer is decremented 108 from a start value, e.g. 0.25-10.0 seconds. Crater filling will continue as long as the timer has not expired 110, 112. Once the timer has expired 110, 114, filler is no longer delivered to the weld, and the welding process terminates at 102.

The techniques of FIGS. 2 and 3 described include implementation of electronic tack delay and crater fill timers. It is noted that both timers are reset to their initial, pre-set values at the initiation of a weld event. As such, each weld event is individually characterized as a tacking event or a welding event. It is also contemplated that a welding system may be constructed to activate the techniques of FIGS. 2 and 3 by default. Conversely, it is also contemplated that a welding system may require a user to activate the adaptive crater fill controls described herein when establishing the operating parameters of the welding session.

Therefore, the present invention includes a welding-type device comprising a controller configured to automatically deactivate an active crater fill control during tacking of a workpiece. The controller is designed to automatically deliver consumable material to a weld upon termination of a weld event and characterize the weld event as a welding event or a tacking event. As such, if the controller characterizes the weld event as a tacking event, the controller prevents the automatic delivery of consumable material to the weld upon termination of the weld event. In this regard, crater filling is disabled during tacking but enabled during welding.

The present also invention includes a method of fusing objects. The method includes the steps of timing an active weld event and determining a temporal length of the active weld event from the timing. If the temporal length is less than a threshold, the method automatically adjusts operation of a welding system to be consistent with a tacking mode of operation. If the temporal length is greater than the threshold, the method automatically adjusts operation of the welding system to be consistent with a welding mode of operation.

A controller for a welding-type system is also presented and is configured to receive feedback on a temporal length of a weld event and compare the temporal length to a threshold. The controller is then configured to selectively activate/deactivate a crater fill process based on the comparison.

While the present invention has been described with respect to a MIG welding system, the invention is not limited to such a system. The present invention may also be applicable with TIG as well as Shielded Metal Arc Welding (stick) welding systems. The invention may also be applicable with robotically controlled welding systems in addition to the human controlled system described with respect to FIG. 1.

The present invention has been described in terms of the preferred embodiment, and it is recognized that equivalents, alternatives, and modifications, aside from those expressly stated, are possible and within the scope of the appending claims.

What is claimed is:

1. A welding-type device comprising a controller configured to:
   initiate a weld event during which consumable material is delivered to a weld; detect a parameter of a weld event;
   determine whether the weld event is a welding event or a tacking event;
   if the weld event is determined to be a tacking event, prevent delivery of additional consumable material to the weld upon termination of the weld event to leave a crater formed during the weld event completely unfilled; and
   if the weld event is determined to be a welding event, automatically deliver consumable material to the weld upon termination of the weld event to fill the crater formed during the weld event without interruption of welding.

2. The welding-type device of claim 1 configured to carry out a MIG or a TIG welding-type process.

3. The welding-type device of claim 1 incorporated into a welder.

4. The welding-type device of claim 1 incorporated into a wire feeder.

5. The welding-type device of claim 1 wherein the controller is further configured to monitor a temporal length of the weld event and automatically prevent the delivery of consumable material to the weld if the temporal length is less than a threshold.

6. The welding-type device of claim 5 wherein the controller is further configured to automatically cause a crater that occurs at an end of the weld event to be filled with welding material upon termination of the weld event if the temporal length of the weld event exceeded the threshold.

7. The welding-type device of claim 5 wherein the controller is further configured to prevent automatic filling of a crater that occurs at an end of a weld with welding material upon termination of the weld event if the temporal length of the weld event at termination thereof is less than the threshold.

8. The welding-type device of claim 5 wherein the controller is further configured to automatically deliver consumable material to the weld if the temporal length of the weld event exceeds the threshold.

9. The welding-type device of claim 8 wherein the controller is further configured to initiate, at welding onset, an active crater fill control to automatically deliver consumable material to the weld and re-initiate the crater fill control once the weld event is complete.

10. The welding-type device of claim 9 wherein the controller is further configured to re-initiate the crater fill control once a trigger of a welding-type gun connected to the welding-type device has been released signaling user termination of the weld event.

11. A method of fusing objects comprising the steps of:
   initiating an active weld event during which consumable material is delivered to a weld; timing the active weld event;
   determining a temporal length of the active weld event from the timing;
   if the temporal length is less than a threshold, automatically adjusting operation of a welding system to be consistent with a tacking mode of operation;
   if the temporal length is greater than or equal to the threshold, automatically adjusting operation of the welding system to be consistent with a welding mode of operation;
   wherein a crater formed during the active weld event is automatically filled with filler material without interruption of welding if the temporal length exceeded the threshold at the termination of the active weld event; and
   wherein the crater formed during the active weld event is prevented from being automatically filled with additional filler material and remains completely unfilled if the temporal length is less than the threshold at the termination of the active weld event.

12. The method of claim 11 further comprising the step re-initiating the step of timing at an onset of a subsequent active weld event.

13. The method of claim 11 further comprising the step of automatically adjusting operation of the welding system to the welding mode of operation from the tacking mode of operation once the temporal length of the active weld event exceeds 1.0 second.

14. The method of claim 11 wherein the method is performed in response to user enabling of an automatic crater fill process, that is designed to be carried out upon the termination of the active weld event, as a parameter of welding system operation for the active weld event.

15. A controller for a welding-type system configured to:
   initiating a weld event during which consumable material is delivered to a weld; receive feedback on a temporal length of the weld event;
   compare the temporal length to a threshold; and selectively activate a crater fill process such that a crater formed during the weld event is filled without interruption of welding or selectively deactivate a crater fill process to prevent delivery of additional consumable material such that a crater formed during the weld event is left completely unfilled based on the comparison.

16. The controller of claim 15 further configured to control operation of a TIG or a MIG welding system.

17. The controller of claim 15 further configured to decrement a timer from a given value upon onset of the a weld event and if the timer has not expired before termination of the weld event then deactivate the crater fill process, and otherwise to activate the crater fill process.

18. The controller of claim 17 further configured to set the timer to a value of 1.0 second at the onset of the weld event.

19. The controller of claim 17 further configured to automatically activate the crater fill process if the timer has expired at or before termination of the weld event, and otherwise to deactivate the crater fill process.

20. The controller of claim 19 further configured to carry out an automatic crater fill for a period between approximately 0.25-10.0 seconds upon termination of the weld event if the timer has expired at or before termination of the weld event.

* * * * *